United States Patent
Miyake

(10) Patent No.: US 6,714,693 B1
(45) Date of Patent: Mar. 30, 2004

(54) IMAGE PROCESSING APPARATUS AND IMAGE PROCESSING METHOD

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/575,243

(22) Filed: May 22, 2000

(30) Foreign Application Priority Data

May 25, 1999 (JP) .......................................... 11-144917

(51) Int. Cl.$^7$ ................................................. G06K 9/32
(52) U.S. Cl. ..................................................... 382/300
(58) Field of Search ................................. 382/300, 298, 382/299, 254, 260, 275, 270, 274, 276; 358/1.2, 451, 465, 528, 525

(56) References Cited

U.S. PATENT DOCUMENTS

| | | | |
|---|---|---|---|
| 4,751,585 A | * 6/1988 | Shibazaki | 358/464 |
| 4,803,558 A | 2/1989 | Hiratsuka et al. | 358/283 |
| 5,054,100 A | * 10/1991 | Tai | 382/300 |
| 5,280,546 A | 1/1994 | Machida et al. | 382/47 |
| 5,410,615 A | * 4/1995 | Mailloux | 382/299 |
| 5,430,811 A | * 7/1995 | Fukushima et al. | 382/254 |
| 5,760,921 A | 6/1998 | Miyake | 358/458 |
| 5,875,268 A | 2/1999 | Miyake | 382/276 |
| 5,889,894 A | * 3/1999 | Ito et al. | 382/300 |
| 5,911,007 A | 6/1999 | Miyake | 382/233 |
| 5,917,963 A | 6/1999 | Miyake | 382/300 |
| 6,157,749 A | * 12/2000 | Miyake | 382/300 |

FOREIGN PATENT DOCUMENTS

| | | |
|---|---|---|
| EP | 0 863 484 | 9/1998 |
| JP | 9-252400 | 9/1997 |
| JP | 10-248012 | 9/1998 |

* cited by examiner

*Primary Examiner*—Bhavesh M. Mehta
*Assistant Examiner*—Kanji Patel
(74) *Attorney, Agent, or Firm*—Fitzpatrick, Cella, Harper & Scinto

(57) ABSTRACT

The present invention uses an image processing apparatus for inputting low-resolution video information, expanding one pixel to N×M pixels, and converting a low-resolution image into a high-resolution image, which comprises a first window formation unit for referring to peripheral pixels including a noticeable pixel, plural conversion units different from each other in conversion method for converting one pixel to N×M pixels, and a selection unit for selecting a proper conversion method out of the plural conversion units in accordance with a distribution state of pixels in a first window and in which the conversion units calculates conversion values for N×M pixels of the noticeable pixel in accordance with an evaluation result of the type of a selected conversion unit in adjacent pixels including the noticeable pixel in an evaluation unit. Thereby, when converting low-resolution information into high-resolution information, it is possible to realize a preferable conversion free from jaggies without causing halation due to interpolation and generate high-resolution information in which continuity is not broken at a boundary point for each conversion in conversions provided with nonlinearity.

14 Claims, 19 Drawing Sheets

FIG. 2

| A | B | C | D | E |
|---|---|---|---|---|
| F | G | H | I | J |
| K | L | M | N | O |
| P | Q | R | S | T |
| U | V | W | X | Y |

FIG. 3

| G' | H' | I' |
|----|----|----|
| L' | M' | N' |
| Q' | R' | S' |

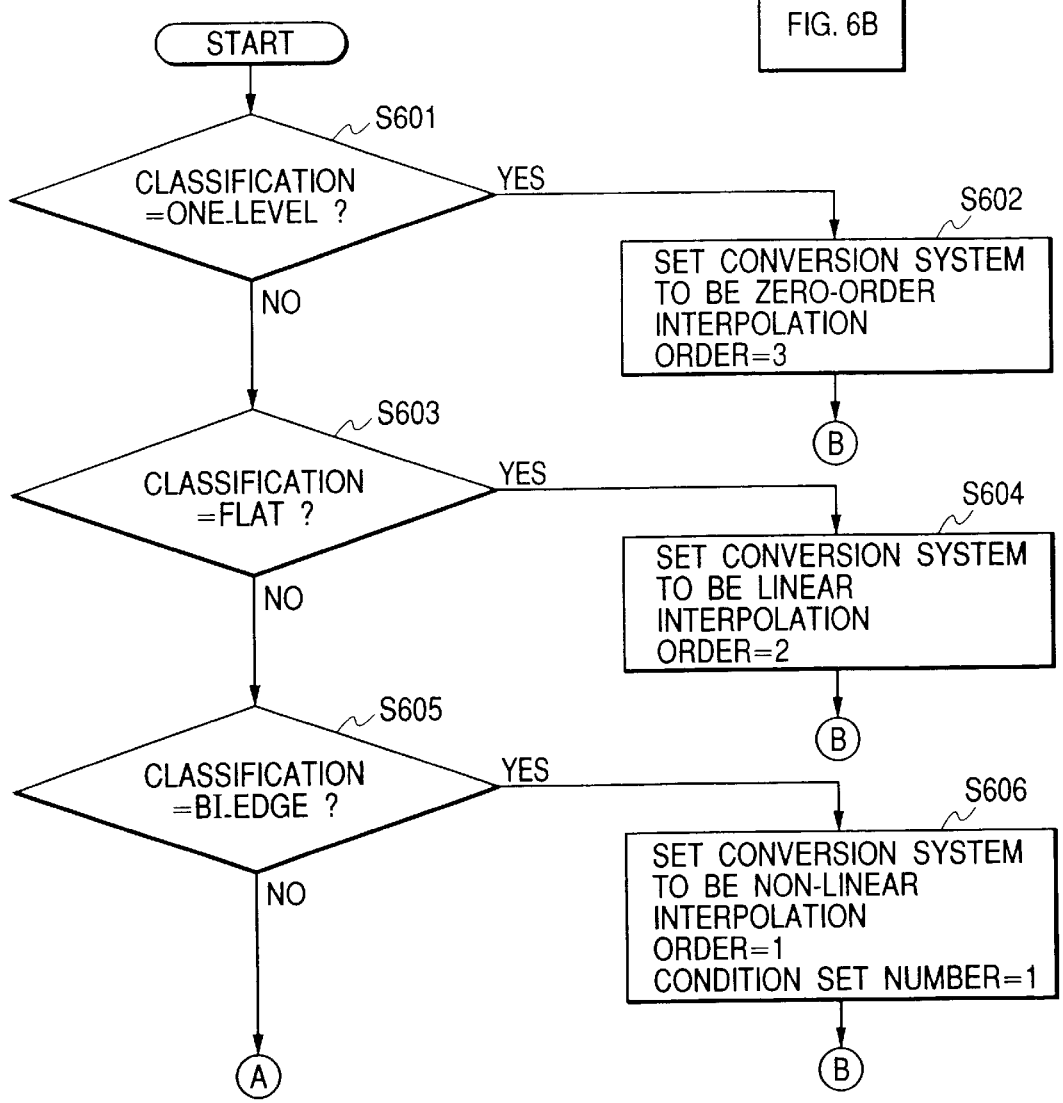

| 1 | 1 | 1 |
|---|---|---|
| 1 | 1 | 1 |
| 1 | 1 | 1 |

J=MIN(|A−E|, |B−E|, |C−E|, |D−E|)= |X−E|

$$\begin{pmatrix} J = \text{SHORTEST DISTANCE FROM INTERPOLATION} \\ \quad\text{POINT TO OBSERVATION POINT} \\ X = \text{OBSERVATION POINT MAKING SHORTEST} \\ \quad\text{DISTANCE} \\ \text{INTERPOLATION POINT } E = X \end{pmatrix}$$

INTERPOLATION POINT E
=(1−i)(1−j) A + i·(1−j) B + j·(1−i) C + ijD

FIG. 22

```
200   10   10   10
 10  200   10   10
 10   10  200   10
 10   10   10  200
```
INPUT INFORMATION

FIG. 23

```
200  200   10   10   10   10   10   10
200  200   10   10   10   10   10   10
 10   10  200  200   10   10   10   10
 10   10  200  200   10   10   10   10
 10   10   10   10  200  200   10   10
 10   10   10   10  200  200   10   10
 10   10   10   10   10   10  200  200
 10   10   10   10   10   10  200  200
```
INFORMATION AFTER RESOLUTION CONVERSION
BY CLOSEST INTERPOLATION METHOD
<DOUBLENESS×DOUBLENESS>

FIG. 24

```
200  105   10   10   10   10   10   10
105  105  105   58   10   10   10   10
 10  105  200  105   10   10   10   10
 10   58  105  105  105   58   10   10
 10   10   10  105  200  105   10   10
 10   10   10   58  105  105  105   58
 10   10   10   10   10  105  200  105
 10   10   10   10   10   58  105  105
```
INFORMATION AFTER RESOLUTION CONVERSION
BY COMMON PRIMARY INTERPOLATION METHOD
<DOUBLENESS×DOUBLENESS>

IMAGE PROCESSING APPARATUS AND IMAGE PROCESSING METHOD

BACKGROUND OF THE INVENTION

1. Field of the Invention

The present invention relates to an image processing apparatus and an image processing method for expanding and variably multiplying input video information or resolution-converting input low-resolution information into high-resolution information.

2. Related Background Art

Various methods for resolution-converting input low-resolution information into high-resolution information have been proposed so far. The proposed conventional methods are different in conversion method depending on the type of a purposed image (for example, multivalued image having gradation information for each pixel, binary image converted into binary notation by a pseudo intermediate gradation, binary image converted into binary notation by fixed threshold, or character image). One of the following methods is generally used as a conventional interpolation method: a closest interpolation method of arranging the same pixel values closest to the interpolation point shown in FIG. 20 and a common primary interpolation method of determining a pixel value E through the following calculation by using four points (pixel values of four points are assumed as A, B, C and D) shown in FIG. 21.

$$E=(1-i)(1-j)A+i\cdot(1-j)B+j\cdot(1-i)C+ijD$$

(In the above expression, when setting an inter-pixel distance to 1, it is assumed that there is a distance i from A in the transverse direction and a distance j from A in the longitudinal direction., $i \leq 1$, $j \leq 1$)

However, the above conventional example has the following disadvantages.

First, though the method shown in FIG. 20 has an advantage that the structure is simple, blocks are visually conspicuous and image quality is inferior because a pixel value is determined for each expanding block when using a purposed image for a natural image.

Moreover, when using a purposed image for a character, line image, or CG (computer graphic) image, the same pixel value continues for each block. Therefore, particularly, a diagonal results in a remarkably-notched inferior image referred to as jaggies. FIGS. 22 and 23 show a state in which a jaggies occurs. FIG. 22 shows input information and FIG. 23 shows an example of resolution conversion in which the number of pixels is doubled in longitudinal and transverse directions in accordance with the method in FIG. 20. In general, image quality further deteriorates as a magnification increases. (Numerals "200" and "10" in FIG. 23 denote pixel values.)

The method in FIG. 21 is a method generally frequently used for expansion of a natural image. In the case of this method, though an averaged and smoothed image quality is obtained, an edged portion or a portion requiring a sharp image quality has a dull image quality. Moreover, in the case of an image obtained by scanning a map or a natural image including characters, important information may not be communicated to a receiver due to halation caused by interpolation.

FIG. 24 shows video information obtained by doubling the input video information in FIG. 22 in longitudinal and transverse directions.

Also as shown in FIG. 24, not only the circumference of a diagonal but also the diagonal cause halation because pixel values are not uniform.

Therefore, various arts for performing resolution conversion at a high image quality have been proposed so far. For example, U.S. Pat. No. 5,280,546 discloses an interpolation method of separating a natural image from a line image in order to remove interpolation halation, applying linear interpolation to the natural image and arranging the maximum and minimum values of peripheral pixels on the linear image by converting the linear interpolation into binary notation. In the case of this art, however, occurrence of jaggies cannot be avoided because interpolation halation occurs on the natural image and high-resolution information is generated while the resolution of low-resolution information is kept in the line image. Moreover, because the line image is also quantized to two gradations, it cannot be avoided that a multigradation line image has an image quality with fewer gradations though there is no problem when original information has only two gradations.

U.S. Pat. No. 5,430,811 shows a non-linear interpolation art using LUT. In the case of this art, however, an algorithm can correspond only to a magnification of doubleness×doubleness. Therefore, to obtain other magnification, it is necessary to repeat the above processing or use the processing together with other expansion processing and thus, processing becomes complex. Moreover, even if a magnification of $2^n$ is realized in repetitive processing, it is not easy to perform control so as to provide a desired non-linearity for each pixel of high-resolution information in the final magnification. Furthermore, in the case of this art, occurrence of jaggies cannot be avoided because values of observation pixels (original information) are not changed similarly to the case of U.S. Pat. No. 5,280,546.

Furthermore, U.S. Pat. No. 5,054,100 also discloses non-linear interpolation. However, though this art is effective for simple interpolation halation of an edge in longitudinal and transverse directions, an effect of the art cannot be obtained if video information becomes slightly complex. Occurrence of jaggies cannot be avoided similarly to the case of the above two conventional examples. Arts for realizing preferable resolution conversion by such as dither method and error diffusion method have been known from old times, in which linear interpolation and reconversion-into-binary-notation are applied to the resolution conversion of a binary image provided with pseudo gradation processing after passing a digital filter through the vicinity of a noticeable pixel and converting the binary image into a multivalued image (U.S. Pat. No. 4,803,558, Japanese Patent Publication No. 61-56665, and the like). There is a proposal of performing preferable resolution conversion when an original image is a multivalued image by using the above arts. However, it is difficult to form a preferable multivalued image provided with spatial continuity of pixel values as long as a quantization art such as a conversion-into-binary-notation art is used as a system for forming an edge.

To remove the above-described disadvantages of the prior art, the present applicant disclosed a conversion preferable for image quality free from jaggies without causing halation due to interpolation which was a particular problem on a natural image or without depending on the low resolution of input original information in U.S. Pat. No. 5,875,268, Japanese Patent Application Laid-Open No. 9-252400, Japanese Patent Application Laid-Open No. 10-248012, and the like.

In the case of the art disclosed in the above official gazettes, however, because high-resolution information is generated by performing non-linear processing every pixel of low-resolution information, the continuity with high-resolution information generated by adjacent pixels is lost and an edged portion of a natural image may be formed into an edged shape serrated in the gradation direction. Particularly, as a magnification of resolution conversion increases, a natural image in which continuity of pixel values is broken and which is artificial and has a sense of incongruity may be formed.

SUMMARY OF THE INVENTION

It is an object of the present invention to provide an image processing apparatus and an image processing method capable of realizing a preferable conversion in image quality without causing halation due to interpolation when converting input low-resolution information into high-resolution information, depending on a low resolution of input original information, or causing no jaggies.

It is another object of the present invention to provide an image processing apparatus and an image processing method making it possible to generate preferable high-resolution information in which continuity is not broken even in a conversion having any non-linearity because it is possible to extinguish the discontinuity at a boundary point every conversion in conversions having non-linearity.

To achieve the above objects, an image processing apparatus of the present invention uses an image processing apparatus for inputting low-resolution video information, expanding one pixel to N×M pixels (each of N and M is an integer equal to or larger than 1 but a case of N=1 and M=1 is excluded), and resolution-converting the input image into a high-resolution image, comprising:

first window formation means for referring to peripheral pixels including noticeable pixels;

a plurality of conversion means different in conversion method of converting one pixel into N×M pixels; and selection means for selecting a proper conversion means out of the above plurality of conversion means in accordance with a distribution state of pixel values in a first window; wherein the conversion means evaluate the type of a selected conversion means in adjacent pixels including noticeable pixels and calculate conversion values for N×M pixels of the noticeable pixels in accordance with the evaluation result.

The image processing apparatus of the present invention further preferably comprises:

second window formation means for referring to the type of a selected conversion means in adjacent pixels including noticeable pixels;

evaluation means for evaluating combinations in a second window;

setting means for setting a representative point at the boundary between a noticeable pixel and an adjacent pixel in accordance with an evaluation result by the evaluation means; and representative-point conversion means for calculating a conversion value of the representative point in accordance with a conversion condition of a selected conversion means of an adjacent pixel; wherein the conversion means calculates conversion values of N×M pixels of noticeable pixels in accordance with the conversion value of the representative point.

Moreover, an image processing method of the present invention uses an image processing method for inputting low-resolution video information, expanding one pixel to N×M pixels (each of N and M is an integer equal to or larger than 1 but a case of N=1 and M=1 is excluded), and resolution-converting the input image into a high-resolution image, comprising:

a first window-forming step of referring to peripheral pixels including noticeable pixels;

a plurality of conversion steps different in conversion method of converting one pixel into N×M pixels; and a selection step of selecting a proper conversion step out of the above plurality of conversion steps in accordance with a distribution state of pixel values in a first window; wherein the conversion steps evaluate the type of a selected conversion step in adjacent pixels including noticeable pixels and calculate conversion values for N×M pixels of the noticeable pixels in accordance with the evaluation result.

The image processing method of the present invention further preferably comprises:

a second window-forming step of referring to the type of a selected conversion step in adjacent pixels including noticeable pixels;

an evaluation step of evaluating combinations in a second window;

a setting step of setting a representative point at the boundary between a noticeable pixel and an adjacent pixel in accordance with an evaluation result by the evaluation step; and representative-point conversion step of calculating a conversion value of the representative point in accordance with a conversion condition of a selected conversion step of an adjacent pixel; wherein the conversion step calculates conversion values of N×M pixels of noticeable pixels in accordance with the conversion value of the representative point.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an illustration showing a window formed by a first window formation unit;

FIG. 3 is an illustration showing a window formed by a second window formation unit;

FIG. 22 is an illustration showing an example of input information;

FIG. 23 is an illustration showing a processing by the method according to FIG. 20 in FIG. 22; and FIG. 24 is an illustration showing a processing by the method according to FIG. 21 in FIG. 22.

DETAILED DESCRIPTION OF PREFERRED EMBODIMENTS

Preferred embodiments of the present invention will be described in detail in accordance with the accompanying drawings.

Figure 1:
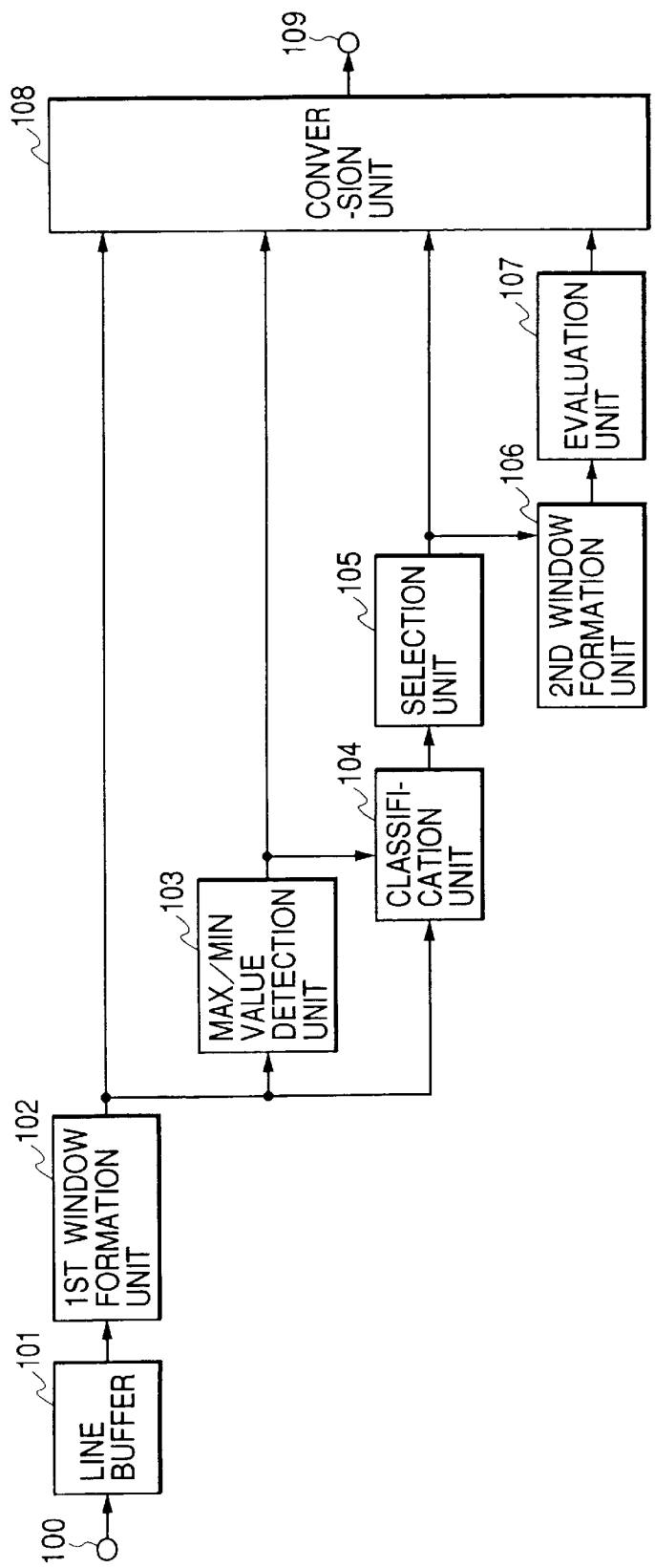
FIG. 1 is a block diagram showing a structure of an embodiment of the present invention.

FIG. 1 is a block diagram of an image processing apparatus of a first embodiment of the present invention. It is efficient to set an image processing apparatus of the present invention mainly in an image output unit such as a printer to which a computer is connected or a video printer to which a video signal is input. Moreover, it is possible to set the image processing apparatus as an image processing apparatus except an image output unit, application software in a host computer, or printer driver software to be output to a printer.

The calculation procedure of the present embodiment is described below by referring to the block diagram in FIG. 1. For the present embodiment, a case is described in which input video information is converted into information for pixels of longitudinally N times and transversely M times. In this case, each of N and M is assumed as an integer larger than 1 and a case of N=1 and M=1 is excluded.

In FIG. 1, numeral 100 denotes an input terminal to which low-resolution video information of n bits/pixel (n>1) is input. Several lines of the low-resolution information are stored in and held by a line buffer 101. A window according to a plurality of peripheral pixels including noticeable pixels is set by the video information of several lines (first window formation unit 102).

Though a window is generally rectangular about a noticeable pixel, it is also considered that the window has a shape other than a rectangle. As shown in FIG. 2, a rectangle having a window size of 5×5 pixels is assumed. A noticeable pixel is M in FIG. 2.

Numeral 103 denotes a maximum/minimum value detection unit which detects the maximum value (assumed as MAX5) and minimum value (assumed as MIN5) in 25 pixels in the window of the unit 102 and moreover detects the maximum value (assumed as MAX3) and minimum value (assumed as MIN3) in 3×3 pixels about the noticeable pixel. Numeral 140 denotes classification unit for evaluating a distribution state of pixel values in accordance with the video information in the window and classifying the type of the noticeable pixel into a type of image. The present embodiment locally judges a plurality of types of image attributes such as whether a noticeable pixel shows a characteristic of a natural image, a characteristic of an artificially-formed image including a CG (computer graphic), a flat portion, or an edged portion and classifies them. In the case of the present embodiment, a window size for classification is set to 3×3 pixels about a noticeable pixel.

Numeral 105 denotes a selection unit for selecting an optimum conversion out of a plurality of held conversion methods in a method for converting one pixel into N×M pixels in accordance with a local characteristic of a classified image.

Numeral 106 denotes means (second window formation unit) which forms a window of a signal showing the type of a selected conversion system (hereafter referred to as conversion-system identification signal) including a noticeable pixel and refers to a conversion-system identification signal of a pixel adjacent to the noticeable pixel. The window size of 106 is assumed as 3×3 pixels about the position of the pixel M serving as a noticeable pixel (FIG. 3).

In FIG. 3, G', H', I', L', M', N', Q', R' and S' show conversion-system identification signals of the pixels G, H, I, L, M, N, Q, R and S in FIG. 2. To calculate G', H', I', L', N', Q', R' and S' except M' serving as a noticeable-pixel conversion-system identification signal, 3×3 pixels are necessary for each pixel classification unit. Therefore, a first window of at least 5×5 pixels (FIG. 2) is necessary. However, when the processing of the noticeable pixel M is completed and processing moves to the position of N serving as the next noticeable pixel, it is possible to reuse values of H', I', M', N', R' and S' by storing the conversion-system identification signal generated in the processing of M. Similarly, because I whose processing is already completed calculates values of J' and O' at the time of the noticeable pixel, storing the conversion-system identification signal is very efficient because a conversion-system identification system to be newly calculated by N at the time of the noticeable pixel requires only a conversion-system identification signal T' at the pixel position of T.

Numeral 107 denotes means for evaluating the content of the window of the conversion-system identification signal generated by 106. The means 107 evaluates a combination of conversion-system identification signals in the window.

Numeral 108 denotes a conversion unit which generates video information of N×M pixels corresponding to a noticeable pixel in accordance with information in the window of original information (first window information), information for maximum and minimum values in the first window, and pieces of information for evaluation results in windows of a noticeable-pixel conversion-system identification signal and an adjacent-pixel conversion-system identification signal.

Converted video information is output to a printer engine and the like through an output terminal 109.

Figure 4:
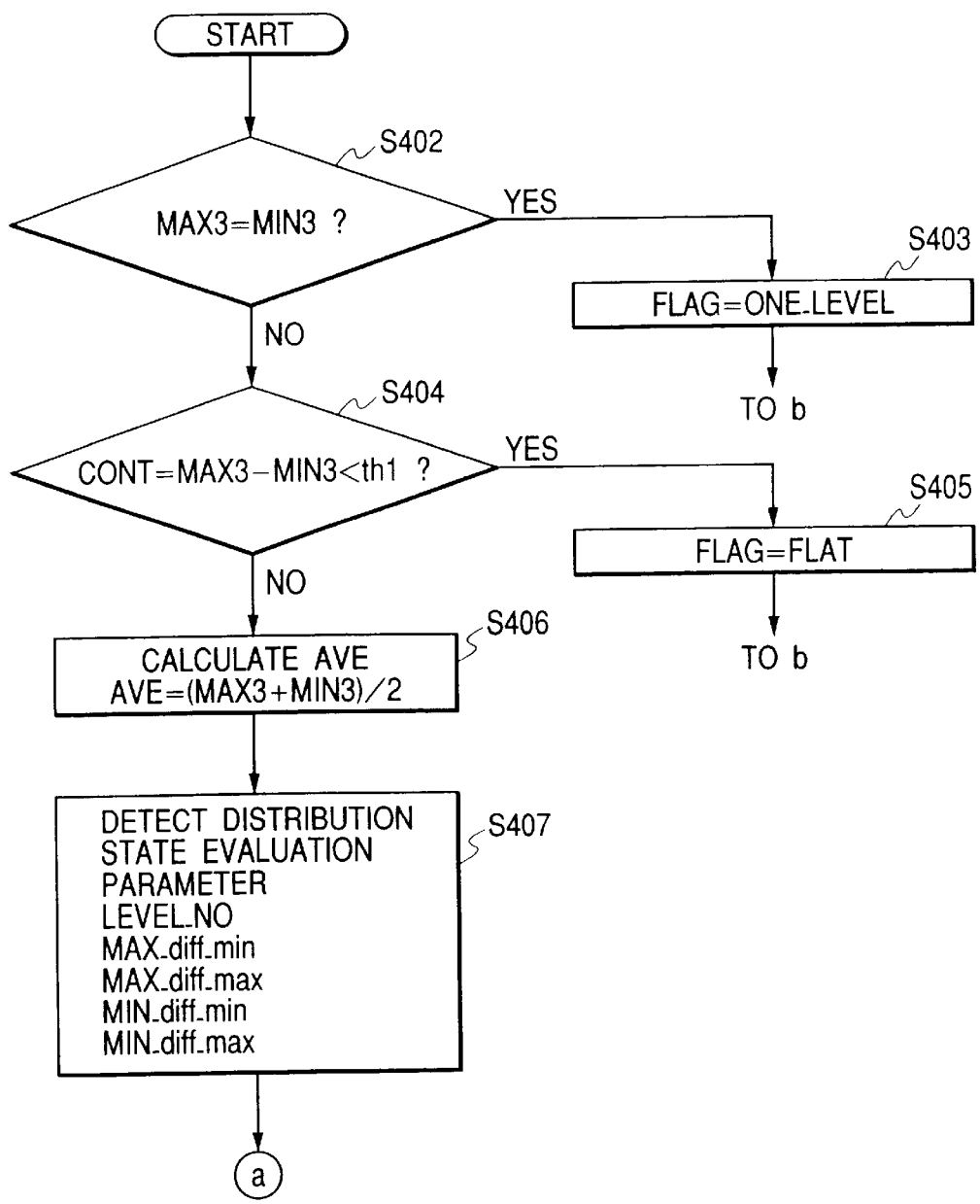
FIG. 4 is a flow chart for explaining processings by the classification unit in FIG. 1.
Figure 5:
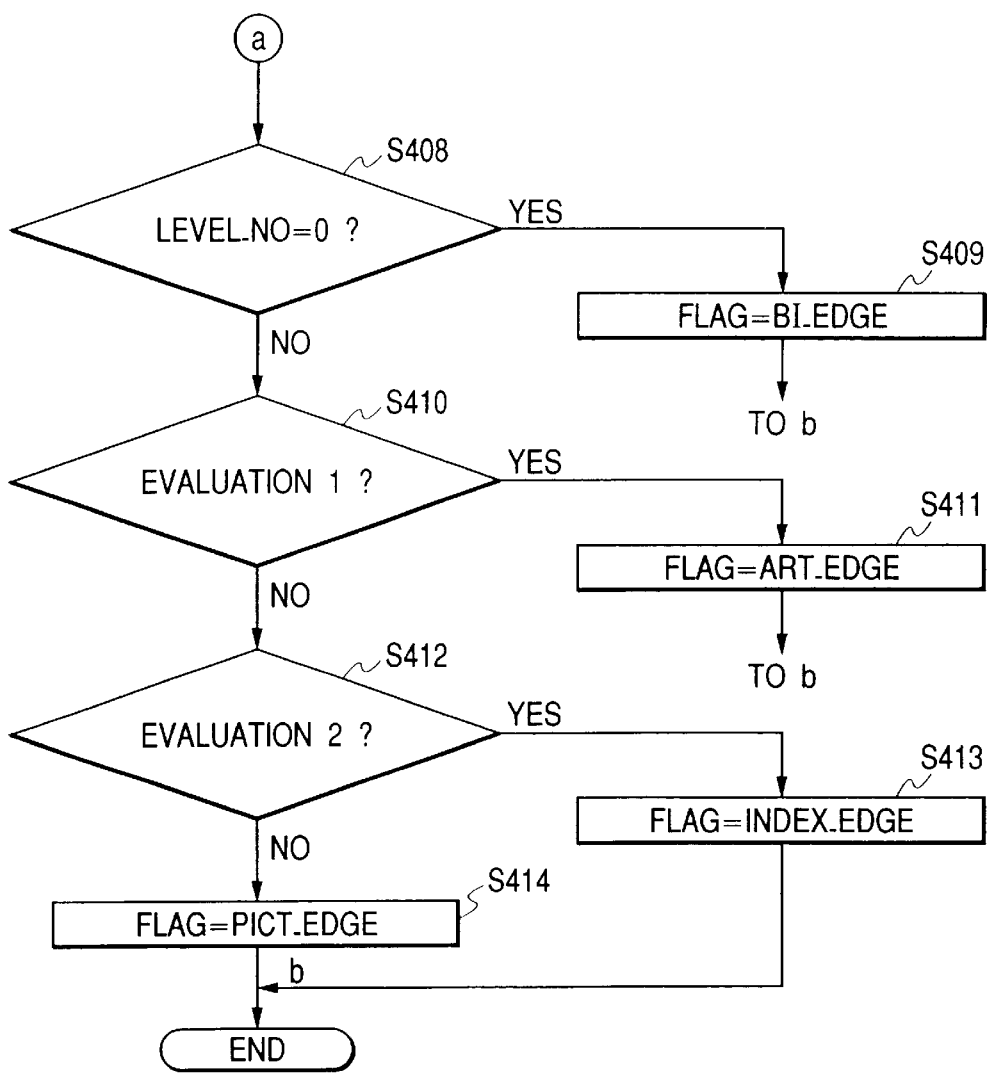
FIG. 5 is a flow chart for explaining processings by the selection unit in FIG. 1.

Then, details of blocks having the structure in FIG. 1 are described below. FIGS. 4 and 5 are flow charts for explaining the calculation procedure of the classification unit 104. In this case, it is assumed that only 3×3 pixels in the first window formed by 102 are used for judgment of classification as described above. In S402, it is judged whether MAX3 is the same as MIN3. When MAX3 is the same as MIN3, it is possible to judge that only one gradation is present in the window of 3×3 pixels. That is, in the case of YES, the attributes are classified into FLAG=ONE_LEVEL. In the case of NO, it is judged whether the difference between MAX3 and MIN3 is larger than a preset threshold (th1) in S404 by assuming that a plurality of gradations are present. When the difference is smaller than the threshold, a flat portion is judged and the attributes are classified into FLAG=FLAT in S405. When the difference is larger than the threshold, an average value AVE between MAX3 and MIN3 is calculated in S406. After three values MAX3, MIN3 and AVE are calculated, inside of the window of 3×3 pixels is scanned again in S407 to calculate the following five types of distribution-state evaluation parameters. LEVEL_NO MAX_diff_min MAX diff_max MIN_diff_min MIN_$_{diff}$_max Though LEVEL_NO is a parameter showing the number of gradations in the window, information for an accurate number of gradations is unnecessary. When it is difficult to form a histogram of pixel values in the window because a lot of processing time is necessary, it is preferable whether the number of gradations is equal to 2 (only MAX3 and MIN3) or 3 or more (LEVEL_NO=1) can be judged.

MAX_diff_min shows a difference between a value (set to A) equal to or more than AVE, other than MAX3 and closest to MAX3 on one hand and MAX3 on the other. Similarly, MAX_diff_max shows a difference between a value (set to B) equal to or more than AVE, other than MAX3 and farthest from MAX3 on one hand and MAX3 on the other. When a value equal to or more than AVE and other than MAX3 is not present, it is preferable that identification can be made in later judgment by setting MAX_diff_min= MAX diff_max=0.

MIN_diff_max shows a difference between a value (set to C) less than AVE, other than MIN3 and closest to MIN3 on one hand and MIN3 on the other. Similarly, MIN_diff_max shows a difference between a value (set to D) less than AVE, other than MIN3 and farthest from MIN3 on one hand and MIN3 on the other. When a value less than AVE and other than MIN3 is not present, it is preferable that identification can be made in later judgment by setting MIN_diff_min=MIN_diff_max=0.

Then, characteristics of an image in the window to classify attributes in accordance with the above five values.

S408 in FIG. 5 judges whether LEVEL_NO is 0, that is, whether there are two gradations or three gradations or more in the window. In the case of YES, the attributes are classified into FLAG=EDGE in S409 by assuming an edged portion of only two gradations. Then, the following evaluations are made in S410.

(Evaluation 1)

diff=CONT−(MAX_diff_max+MIN_diff_max)

1. diff_>th2 and MAX_diff_max<th3 and MIN_diff_max<th3

2. diff_>th4 and MAX_diff_min>th5 and MIN_diff_min>th5

(1 or 2) or not. (th2, th3, th4 and th5 are preset thresholds.) (1)

In the case of YES in S410, the attributes are classified into FLAG=ART_EDGE in S411 by assuming that characteristics of an artificially-formed edge are shown.

In the case of NO, the following evaluations are made in S412.
(Evaluation 2)

MAX_diff_min>th6 and MIN_$_{diff}$_min>th6 (th6 is a preset threshold.) (2)

(However, th2>th4>th6 is preferable.)

In the case of YES, classification of FLAG=INDEX_EDGE is set in S413 because video information to which pseudo gradation processing is previously applied may be present. In the case of NO, FLAG=PICT_EDGE is set in S414 because of being close to a characteristic of an edged portion of a natural image. The above Items (1) and (2) evaluate a discrete state of pixel values in a window.

Because Evaluation 1 shows the so-called "middle-missing" distribution in which pixel values are biased to the vicinity of MAX3 and MIN3 and pixels at the middle portion are absent {1 of (1)} or a discrete distribution in which MAX3 to MIN3 are generally uniformly quantized {2 of (2)}, an artificially-formed image is judged.

Because Evaluation 2 shows a distribution in which values close to MAX3 and MIN3 show a discrete "toothless" distribution rather saying that values close to MAX3 and MIN3 are continuous though artificiality as remarkable as that of the case of Evaluation 1 is not seen, an original natural image is judged as video information which is previously quantized to several bits due to compression of a transmission line before an image processing apparatus input of the present embodiment. Pseudo-gradation video information of several bits frequently circulates through Internet that is recently quickly spread independently of an artificial image or natural image. A distribution showing a discrete trend more or less like the above distribution is not easily formed at an edged portion of a natural image such as a photograph input from capture means having many gradations such as an image scanner or digital camera due to weakening of MTF at the time of input and continuity is always found at a part of a distribution.

The above described is an example of classification means. The classification means of the present embodiment provides six types of classifications such as ONE_LEVEL, FLAT, BI_EDGE, ART_EDGE, INDEX_EDGE and PICT_EDGE. It is a matter of course that classifications more than six or less than six are permitted.

Moreover, it is permitted to use the information of 5×5 pixels instead of 3×3 pixels or use the information of MAX5 and MIN5 for evaluation together with the information of MIN3. It is a matter of course that evaluation parameters more than or less than the above can be used.

Figure 6B:
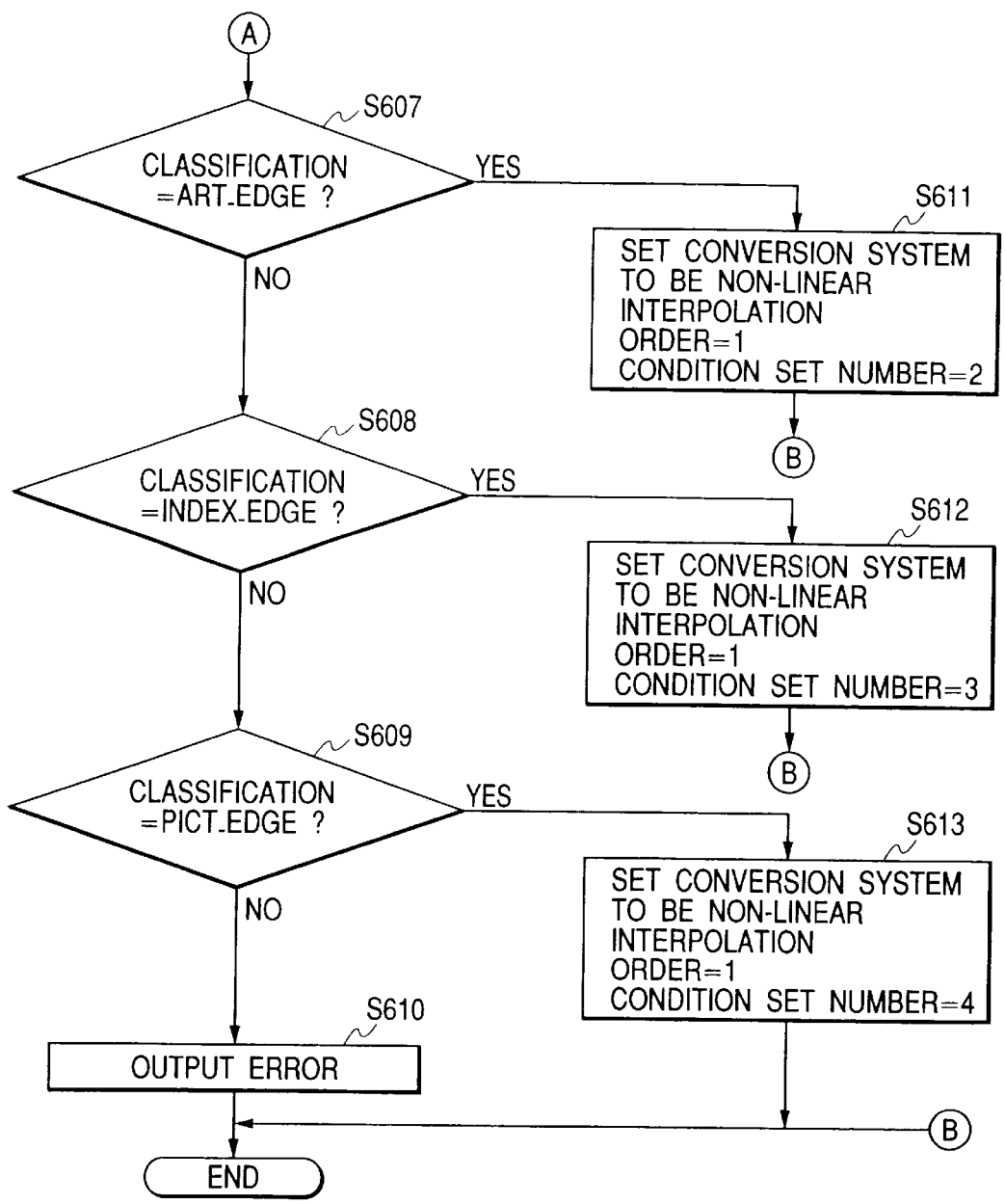
FIG. 6 which is composed of FIGS. 6A and 6B is a flow chart for explaining processings by the selection unit in FIG. 1.

Then, details of the selection unit 105 are described below. FIGS. 6A and 6B are flow charts showing a processing procedure by the selection unit. In FIGS. 6A and 6B, an optimum conversion method is selected in the above six types of classifications.

S601 in FIGS. 6A and 6B judges whether a classification signal that is an output of the classification unit is ONE_LEVEL. If the signal is ONE_LEVEL, a conversion system is set to zero-order interpolation in S602. Moreover, because conversion systems are previously sequenced and "3" which is the order of the zero-order interpolation is assigned. The order of a conversion system shows the priority of the conversion system. In the case of the present embodiment, the priority lowers as a value of an order increases.

S603 judges whether a classification signal which is an output from the classification unit is FLAT. If the signal is FLAT, a conversion system is set to linear interpolation (primary interpolation). Number "2" which is the order of linear interpolation is assigned as the order of the conversion system.

S605 judges whether a classification signal that is an output of the classification unit is BI_EDGE. If the signal is BI_EDGE, a conversion system is set to nonlinear interpolation in S606. Number "1" which is the order of the nonlinear interpolation is assigned as the order of the conversion system. Moreover, a condition setting number storing a condition such as a sum-of-products coefficient used for sum-of-products calculation of nonlinear interpolation is set to 1.

Similarly, ART_EDGE or not is judged in S607, INDEX_EDGE or not is judged in S608, and PICT-EDGE or not is judged in S609. If classification does not belong to any of them, an error is output in S610.

When it is judged to be ART-EDGE, INDEX_EDGE and PICT_EDGE in the above-described S607, S608 and S609, a conversion system is set to nonlinear interpolation in S611, S612 and S613 and number "1" which is the order of the nonlinear interposition is assigned. Moreover, condition setting numbers used for the nonlinear interpolation are set to 2, 3 and 4 to complete the operation.

Figure 7:
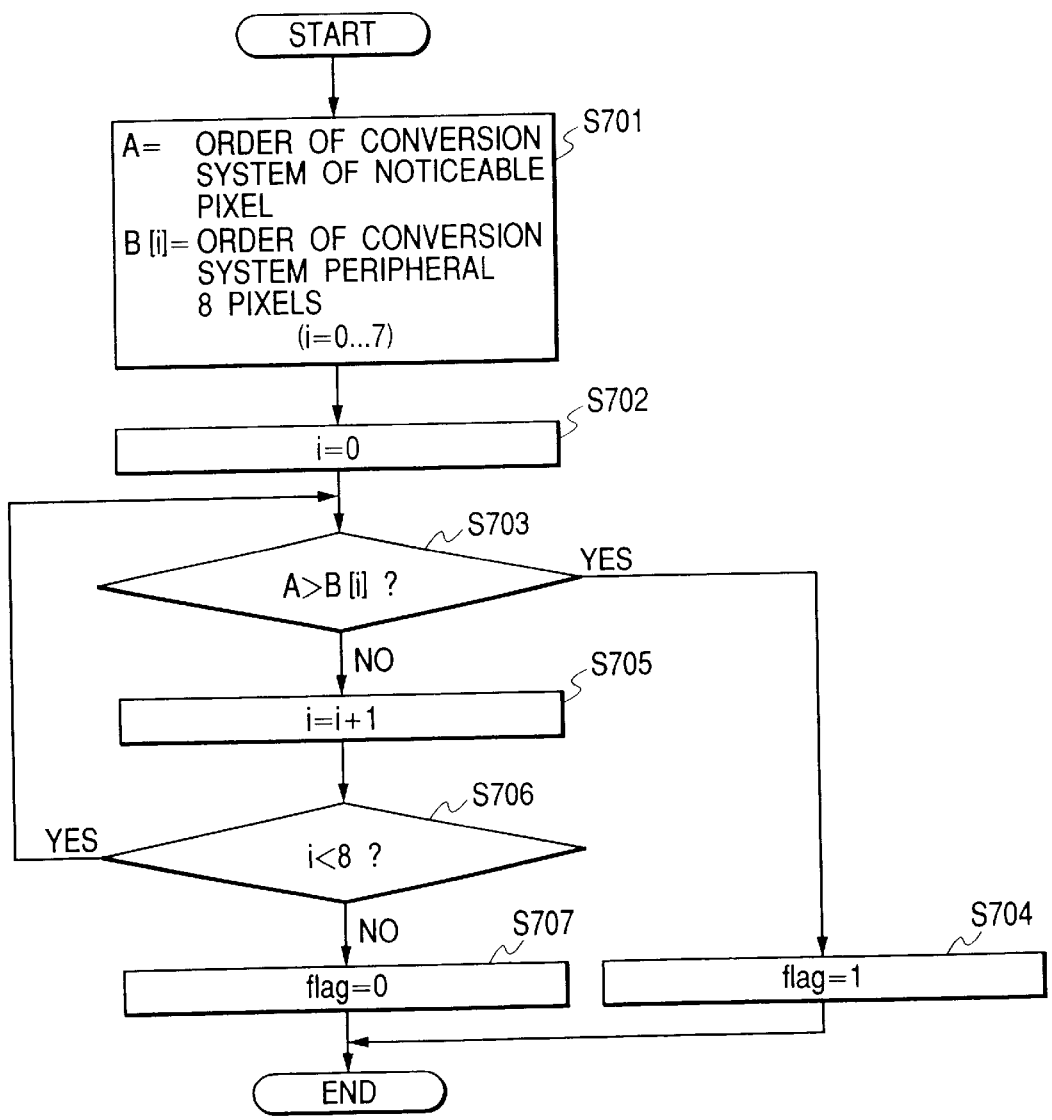
FIG. 7 is a flow chart for explaining processings by the evaluation unit in FIG. 1.

Then, the evaluation unit 107 in FIG. 1 is described. FIG. 7 is a flow chart showing the processing procedure of the evaluation unit.

S701 in FIG. 7 shows initialization, in which the order of a conversion system of a noticeable pixel is assigned to a variable A, and orders of conversion systems of 8 circumferential pixels surrounding the noticeable pixel in the second window formed by 106 in FIG. 1 are assigned to for variable B[i] (i is an integer from 0 to 7). S702 assigns 0 to i in initialization. S703 shows comparison means to compare orders each other. That is, it compares the order of the conversion system of the noticeable pixel with orders of conversion systems of circumferential pixels. If orders of conversion systems of circumferential pixels is lower, than the order of the conversion system of the noticeable pixel, 1 is assigned to a flag serving as a variable in S704. When a negative result is obtained in S703, the value of i is counted by 1 in S705 to judge whether comparison of eight circumferential pixels is completed. If the comparison is not completed, the comparison in S703 is repeated. If orders of eight circumferential pixels are not lower than the order of the noticeable pixel, 0 is assigned to a flag serving as a variable in S707 to complete the operation.

Figure 8:
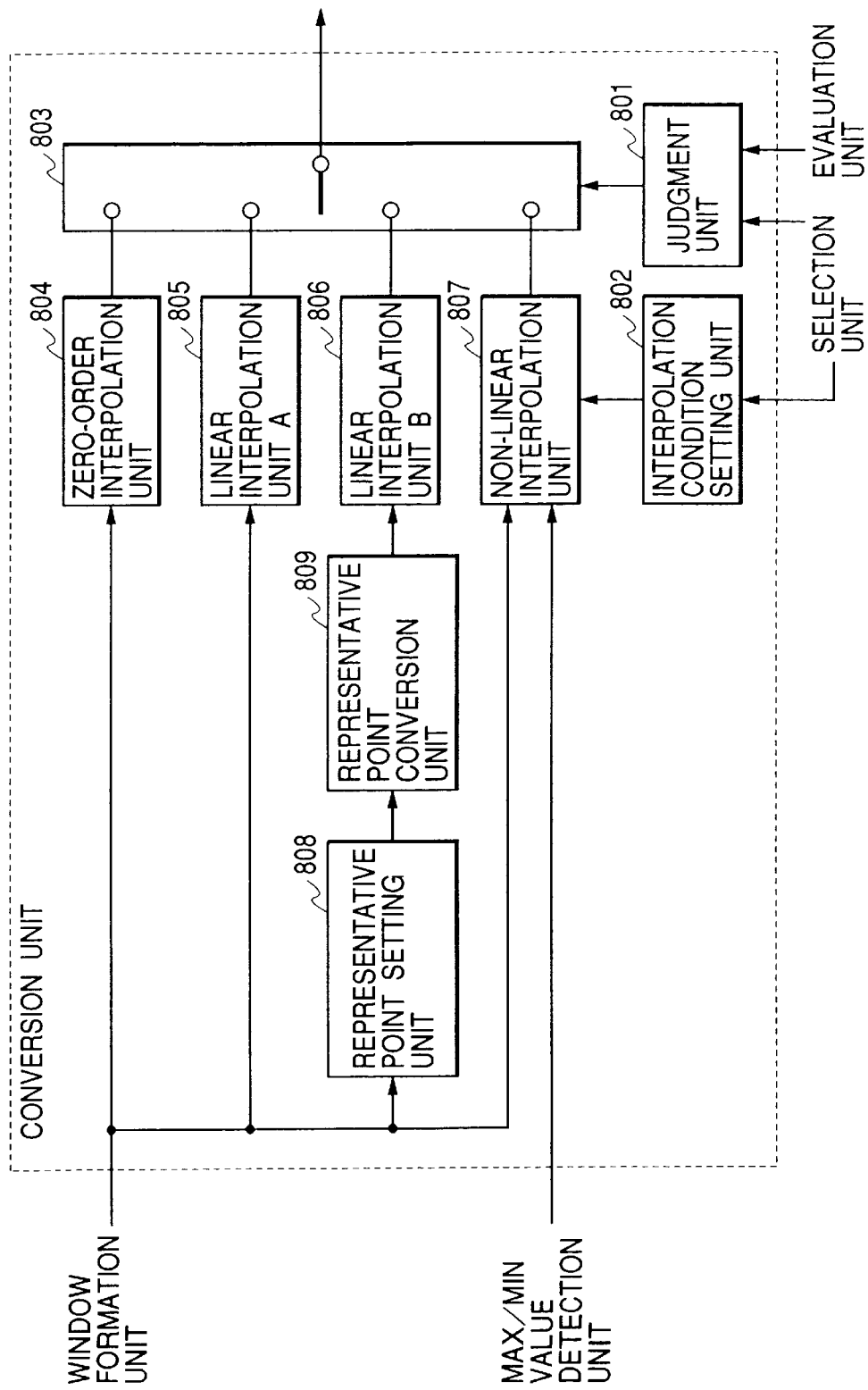
FIG. 8 is an illustration showing a structure of the conversion unit in FIG. 1.

Then, the conversion unit 108 in FIG. 1 is described below. FIG. 8 is a block diagram of an essential portion of the conversion unit 108. The block enclosed by a broken line shows the conversion unit 108. A conversion-system identification system of a noticeable pixel output from the selection unit 105 is transmitted to a judgement unit 801 and an interpolation-condition setting unit 802. An evaluation result in the window of the conversion-system identification signal output from the evaluation unit 107 is similarly transmitted to the judgement unit 801. The judgment unit 801 outputs an instruction to a switch 803 in accordance with a judgment result and an optimum conversion system is selected. The switch 803 changes four types of conversion systems, that is, changes conversion systems of a zero-order interpolation unit 804, linear interpolation unit-A 805, linear interpolation unit-B 806, and nonlinear interpolation unit 807. Each interpolation unit performs interpolation in accordance with the pixel-value information sent from the first window. The nonlinear interpolation unit receives maximum/minimum value information in the window sent from a maximum/minimum value detection unit.

Figure 9:
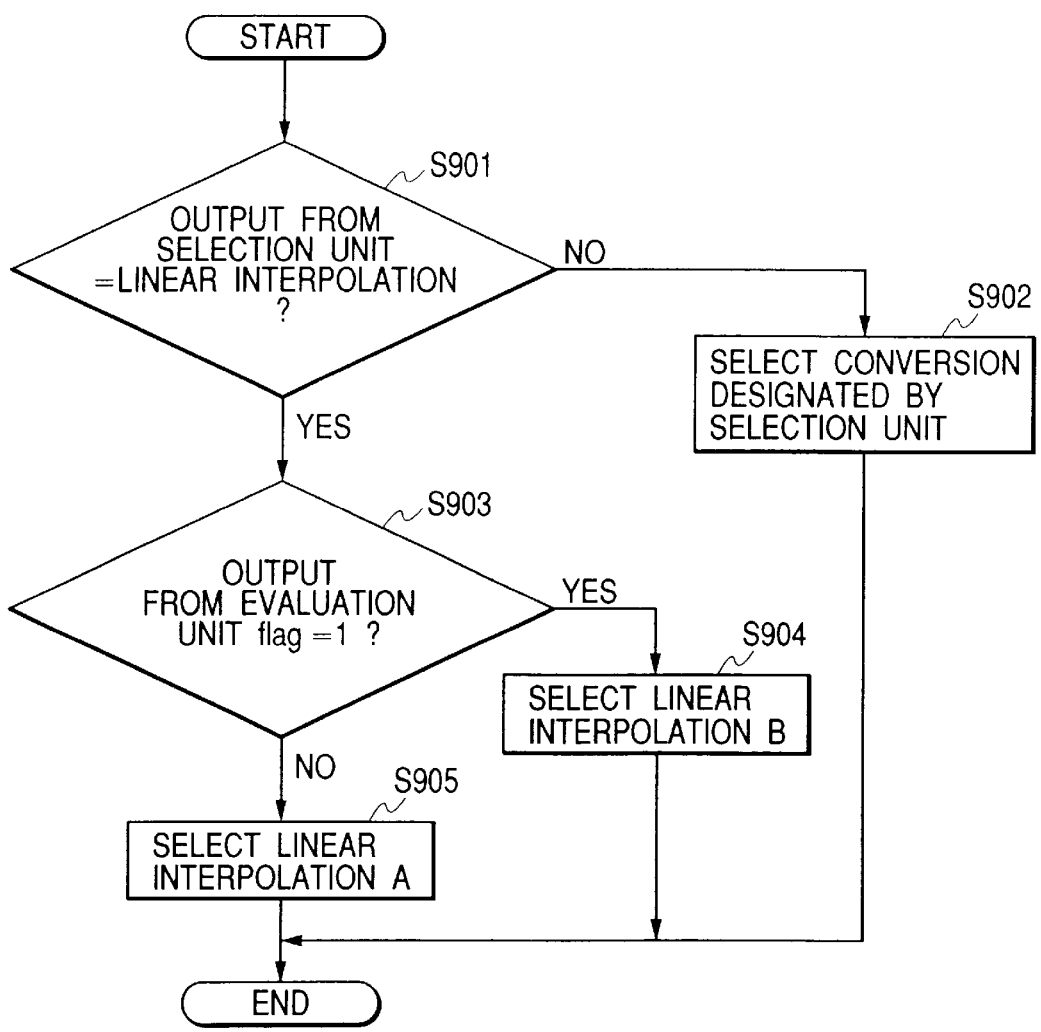
FIG. 9 is an illustration showing a structure of the judgement unit in FIG. 8.

FIG. 9 is a flow chart showing a processing procedure of the judgment unit 801. S901 judges whether an output from the selection unit shows linear interpolation. If the output does not show linear interpolation, a conversion system designated by the selection unit is selected in S902 to complete the operation. When it is judged in S901 that the output shows linear interpolation, it is judged whether a variable flag serving as an output of the evaluation unit is set to 1. When the variable flag is set to 1, the linear interpolation B is selected in S904. When the flag is not set to 1, linear interpolation A is selected in S905 to complete the operation. That is, when a conversion system of a noticeable pixel conforms to linear interpolation and conversion systems of eight circumferential pixels conform to conversion systems having orders lower than the order of the linear interpolation, linear interpolation B is selected.

Then, each interpolation method is described below.

Figure 20:
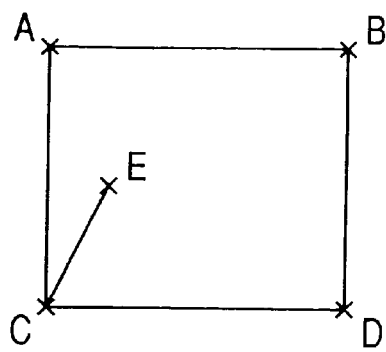
FIG. 20 is an illustration of a closest interpolation method that is a conventional example.

The zero-order interpolation unit 804 is equivalent to the system (closest interpolation method) shown for the conventional example in FIG. 20, which can be realized by outputting N×M noticeable pixels.

Figure 21:
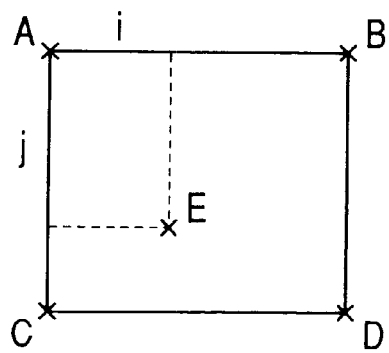
FIG. 21 is an illustration of a common primary interpolation method that is a conventional example.

The linear interpolation unit-A 805 is equivalent to the system (common primary interpolation method) shown for the conventional example in FIG. 21, which is means for linearly determining a relative positional relation between a sample point and an interpolation point and an interpolation value at the interpolation point. To calculate the interpolation point, it is enough that there is the peripheral pixel information of 3×3 pixels including the noticeable pixel in the first window.

Figure 10:
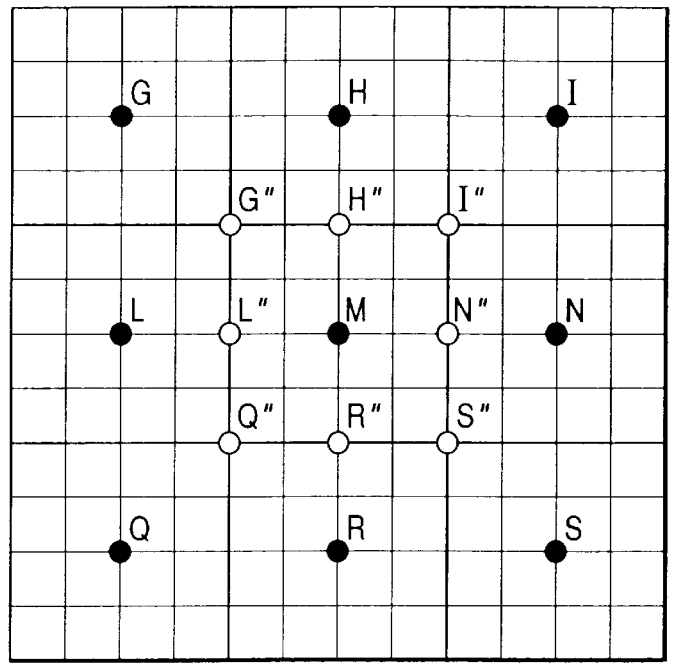
FIG. 10 is an illustration showing setting positions of the representative point setting unit in FIG. 8.

The linear interpolation-B 806 is an independent method of the present embodiment. First, a representative point necessary for an interpolation calculation is set by a representative-point setting unit 808 from the first window. As shown in FIG. 10, a representative point is set to a middle position between a noticeable point and each sample point of each peripheral pixel. FIG. 10 shows a case of N=M=4, in which a black-circle mark denotes a sample point and a white-circle mark denotes a representative point. Set representative points are assumed as G", H", I", M", N", Q", R" and S".

Figure 11:
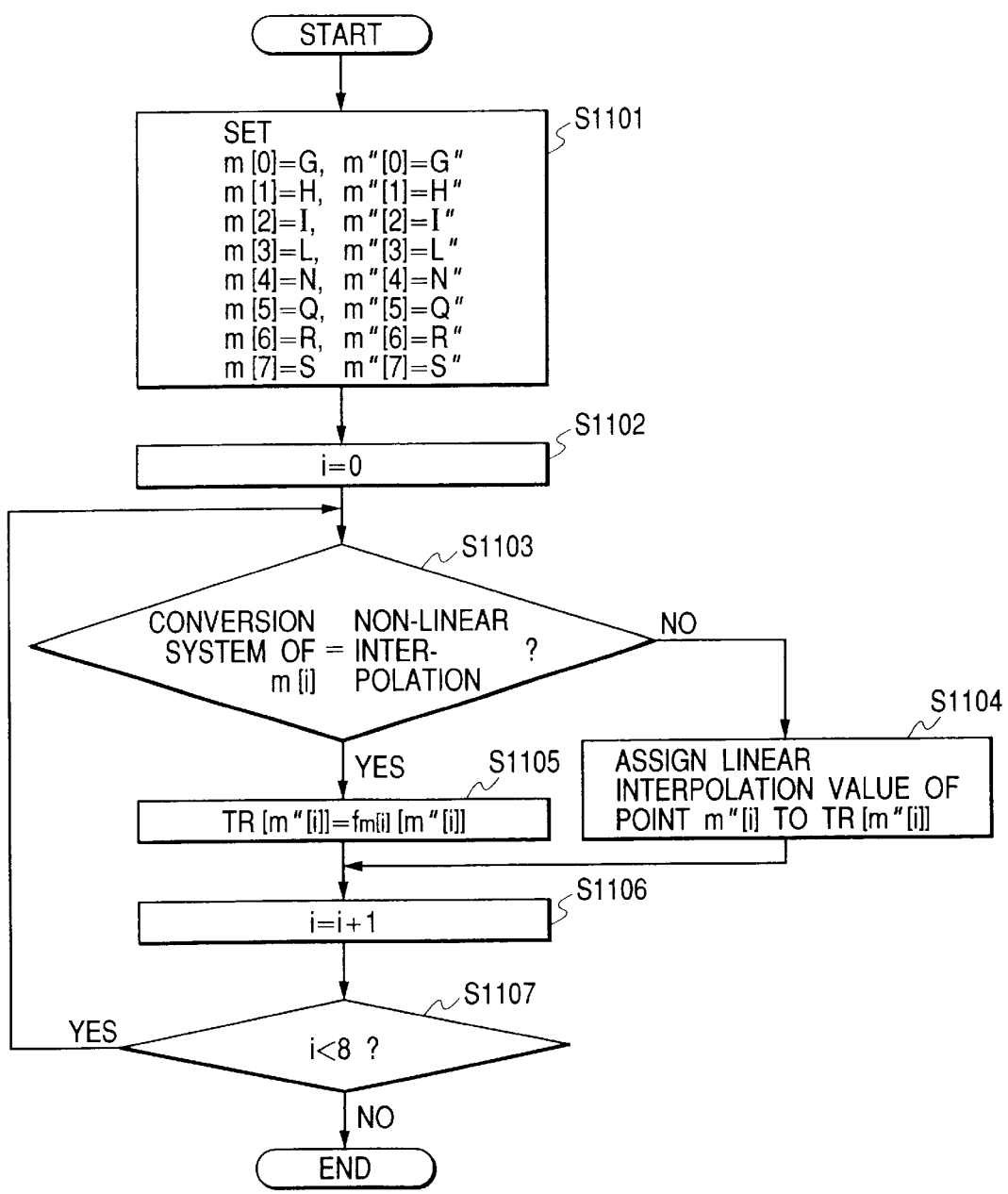
FIG. 11 is a flow chart for explaining processings by the representative-point conversion unit in FIG. 8.

A representative-point conversion unit 809 is means for calculating conversion values of the eight set representative points. FIG. 11 is a flow chart showing the processing procedure of the representative-point conversion unit.

In FIG. 11, S1101 handles eight pixels of sample points as variables of m[] and eight pixels of the set representative points as variables of m"[] in initialization in order to simplify description.

S1102 assigns 0 to a variable i in initialization of variables.

S1103 judges whether the conversion system of a sample point m[i] conforms to non-linear interpolation. That is, in the case of the present embodiment, it is necessary to previously determine a conversion system of an adjacent pixel to be scanned after a noticeable pixel. When a negative result is obtained in S1103, a linear interpolation value at a representative point is calculated in S1104 to assign the calculated linear interpolation value to a conversion value (assumed as TR).

When it is judged in S1103 that the conversion system of the sample point m[i] conforms to nonlinear interpolation, the following calculation is performed in S1105.

$$TR[m"[i]] = fm[i][m"[i]] \qquad (3)$$

(fm[i][a] shows a conversion result according to the nonlinear interpolation of the sample point m[i] at a point a.)

That is, a conversion value of a representative point is calculated not through a conversion system selected for a noticeable pixel but through nonlinear conversion of adjacent circumferential pixels.

Values of variable i are counted in S1106 and it is judged in S1107 whether counting of value of i is completed for eight pixels. When the counting is not completed, the operation is repeated.

When counting of values of i is completed for eight pixels, a conversion value of each representative point is calculated.

Figure 12:
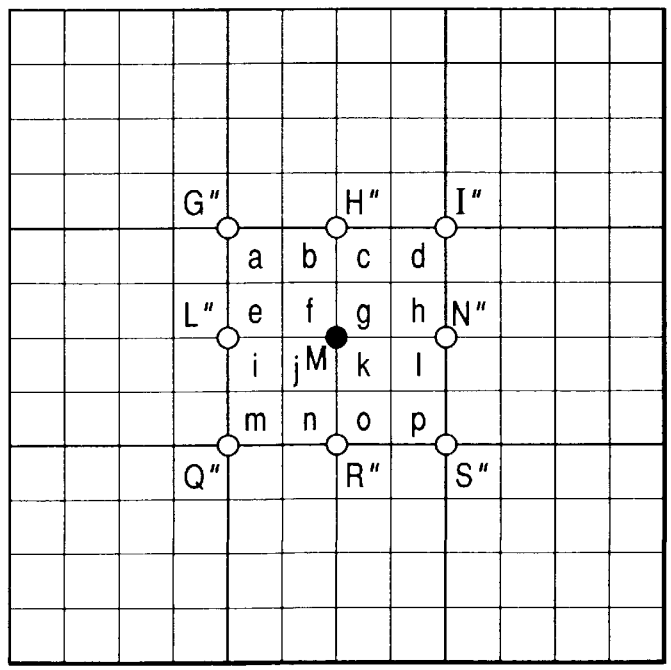
FIG. 12 is an illustration showing conversion pixel positions in a noticeable-pixel block.

In the case of the linear interpolation unit B in FIG. 8, the processing system for linear interpolation is not changed but sample points used for calculation are changed. That is, the linear interpolation A performs linear interpolation by using the sample point of original information but the linear interpolation B performs linear interpolation in accordance with a conversion value of a representative point. That is, calculations for linear interpolation are performed in accordance with eight conversion values such as TR[G"], TR[H"], TR[I"], TR[L"], TR[N"], TR[Q"], TR[R"] and TR[S"] and a pixel value of M serving as a noticeable pixel. In the case of the example in FIG. 9, conversion values of 16 pixels are calculated because of N=M=4. As shown in FIG. 12, however, conversion values of interpolation points of a to p about the noticeable pixel are calculated.

Then, an example of nonlinear interpolation is described below in detail.

Figures 13, 14:
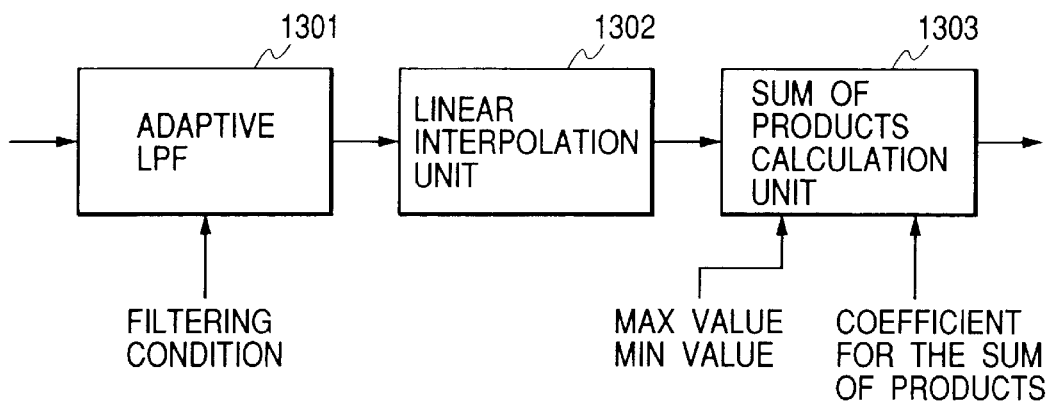
FIG. 13 is an illustration showing a structure of the non-linear interpolation unit in FIG. 8.
FIG. 14 is an illustration showing a smoothing filter (LPF)

FIG. 13 shows a structure of a nonlinear interpolation unit. In FIG. 13, numeral 1301 denotes an adaptive LPF (Low Pass Filter) unit that performs filtering in accordance with the input pixel information in the first window. A proper filter coefficient and a proper number of taps are given from the interpolation-condition-setting unit in order to remove high-frequency components dependent on input low-resolution information. As a matter of course, it is preferable to previously experimentally set an optimum filter condition for each classified class. FIG. 14 shows a filter.

Numeral 1302 denotes a linear interpolation unit that is means for performing linear interpolation in accordance with the above-described information in the window after the LPF. It is a matter of course that an LPF suitable for each pixel is applied to each pixel other than the noticeable pixel in the window.

Numeral 1303 denotes a calculation unit for calculating interpolation values in accordance with the interpolation information for linear interpolation, maximum/minimum information (above-described MAX5, MIN5, MAX3 and MIN3 in the case of the present embodiment) in a window sent from maximum/minimum value detection means and sum-of-products coefficient sent from the selection unit.

The calculation unit calculates an interpolation value OUT[i][j] at an interpolation point (i,j) through the following calculations.

$$up[i][j]=(a \times MAX3+b \times inter\_data[i][j])/(a+b)$$

$$down[i][j]=(a \times MIN3+b \times inter\_data[i][j])/(a+b)$$

$$mid[i][j]=c inter\_data[i][j]+d \times MAX3+d \times MIN3+e \times MAX5+e \times MIN5$$

(i . . . 0 to N−1)

(j . . . 0 to M−1)

(A) Case if mid[i][j]>up[i][j], out[i][j]=up[i][j]

(B) Case if mid[i][j]≦down[i][j], out[i][j]=down[i][j]

(C) Cases other than the above, out[i][j]=mid[i][j]

Symbols a, b, c, d and e respectively denote a coefficient.

A notation "inter_data[i][j]" denotes an interpolation value of an interpolation point (i,j) according to linear interpolation.

A notation "out[i][j]" denotes an output value of an interpolation point (i,j) from the nonlinear interpolation unit (4)

It is a matter of course that all linear-interpolation calculation units (calculation of inter_data[i][j]) used by the nonlinear interpolation unit can be used in common.

Figure 15:
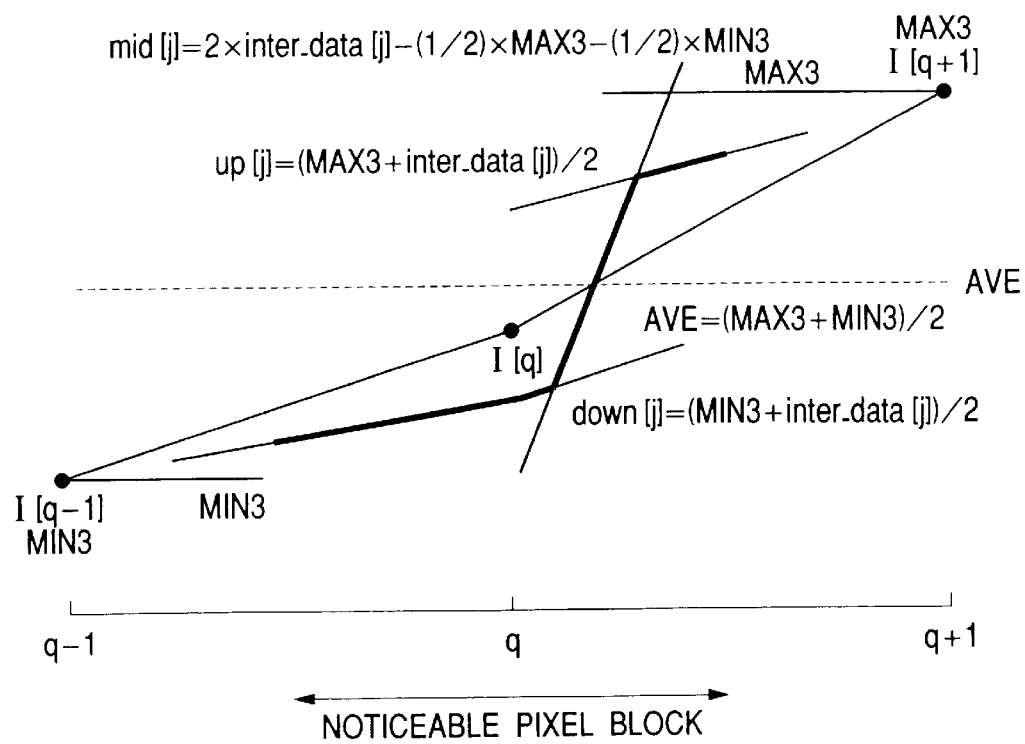
FIG. 15 is an illustration showing a case of generating high-resolution information.
Figure 16:
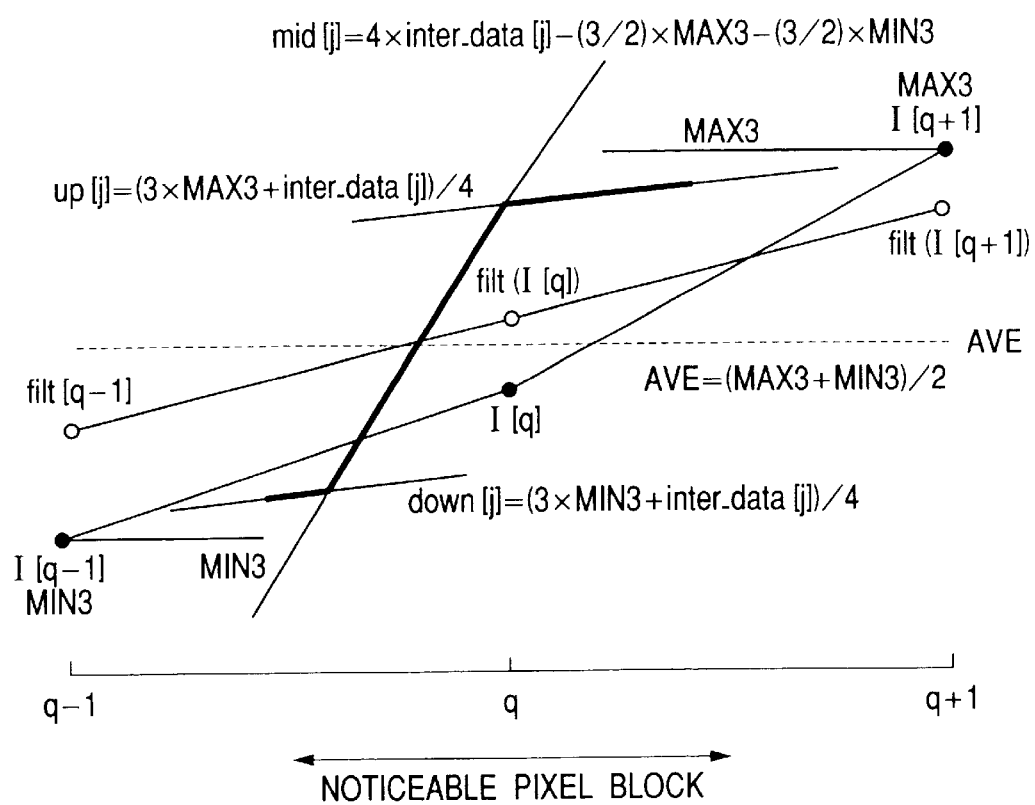
FIG. 16 is an illustration showing a case of generating high-resolution information.

FIGS. 15 and 16 are illustrations analogously showing the above-described loci of up, down and mid in one dimension in order to simply the description. FIG. 15 shows a case of using the pixel value information of the first window formation unit, in which the abscissa shows spatial coordinate and the longitudinal direction shows density. When assuming a noticeable pixel as q, an observation pixel value becomes I[q] shown by a black-circle mark (pixel values of spatially front and rear sample points are assumed as I[q−1] and I[q+1]). An interpolation range when the noticeable pixel is converted is analogously shown as a noticeable-pixel block. A locus shown by a thick line becomes an output OUT depending on the relation between sizes of three loci of up, down and mid. Coefficients used are a=1, b=1, c=2, d=−1/2 and e=0. As shown in FIG. 15, it is possible to realize nonlinear interpolation in which an edge tilt becomes sharp.

FIG. 16 shows a case of using a filter for the adaptive LPF unit. A point indicated by a white-circle mark shows a pixel value after conversion using an adaptive LPF. However, to simplify the description, an observation pixel according to the first window is also shown in FIG. 16 to show a relative positional relation with a conversion value. In the case of a high-resolution image formed through the second window, an edge position is slightly different from the case of using the first window. A shift of the edge position is very effective to reduce jaggies.

Coefficients used in FIG. 16 are a=3, b=1, c=4, d=−3/2 and e=0.

FIGS. 15 and 16 respectively describes a case in which I[q−1] is MIN3 and I[q+1] is MAX in order to simply the description. It is a matter of course that the present embodiment makes it possible to realize preferable nonlinear interpolation in any case.

For the present embodiment, the sum-of-products calculation between the linear interpolation unit and a representative value in the window is described in the form of the expression (4) in order to simply the description. However, because linear interpolation is effectuated by the sum-of-products calculation, it is possible to describe the linear interpolation in the form of one sum-of-products calculation. That is, because linear interpolation is effectuated by sum-of-products calculations of conversion values after IPF of four points surrounding an interpolation point, nonlinear interpolation is effectuated by sum-of-products calculations of the total of eight points when using four points of MAX3, MIN3, MAX5 and MIN5 as representative values in the window as described above.

Nonlinear interpolation is effectuated by the following thought. That is, to remove an input resolution dependent part from input video information, adaptive smoothing for cutting high-frequency components of input resolution is necessary. However, even if only already-passing low-frequency components are output, an image having only remarkable halation is obtained. Therefore, nonlinear interpolation is indispensable that generates a high-frequency component corresponding to an output resolution. By selecting representative pixel values (corresponding to the maximum and minimum values in the case of the present embodiment) out of peripheral pixels and executing an adaptive sum-of-products calculation between linear interpolation and the representative pixel value, a nonlinear property is generated. Moreover, by changing or optimizing coefficients of the sum-of-products calculation, it is possible to easily control nonlinearity. Furthermore, it is possible to dynamically and continuously change coefficients in accordance with the intensity of the contrast of an edge instead of stepwise change of the coefficients. The basic thought is the same not only for CG and a line image but also for a natural image. However, it is not permitted to greatly deviate a natural image from input information because "naturality" is requested for the quality of an output natural image. In the case of only linear interpolation, however, interpolation halation occurs due to reduction of high-frequency components. Therefore, to generate a new high-frequency component, an optimum LPF or nonlinear interpolation for executing an adaptive sum-of-products calculation between linear interpolation after a through filter and a representative pixel value among peripheral pixels is indispensable for improvement of image quality.

By using the processing of the present embodiment, it is possible to form an image having any attribute or an image corresponding to an output resolution preferable for the processing of any enlargement magnification. As a matter of course, it is permitted to change various coefficients by using an enlargement magnification as an evaluation variable or evaluate and interpolation described for FIGS. 15 and 16, the continuity of conversion values cannot be assured when pixels are changed though optimum conversion is performed every pixel.

The adove-described nonlinear interpolation is an example. As a matter of course, other nonlinear interpolation can be also considered. Moreover, it is possible to obtain an interpolation value by previosly calculating a relative value of nonlinear interpolation, stroring it in a LUT (Look-Up Table), and referring to the LUT.

The structured of the preset embodiment show in FIG. 1 is described above. An object of the present invention is how to keep the continuity of converted pixel values when performing adaptyve interpolation pixal values when performing adaptive interpolation conversion every pixel.

For example, when executing the nonlinear interpolation described for FIGS. 15 and 16, the conntinuity of conversion values cannot be assured when pixels are charged though optimum coversion is performed every pixel.

Figure 17:
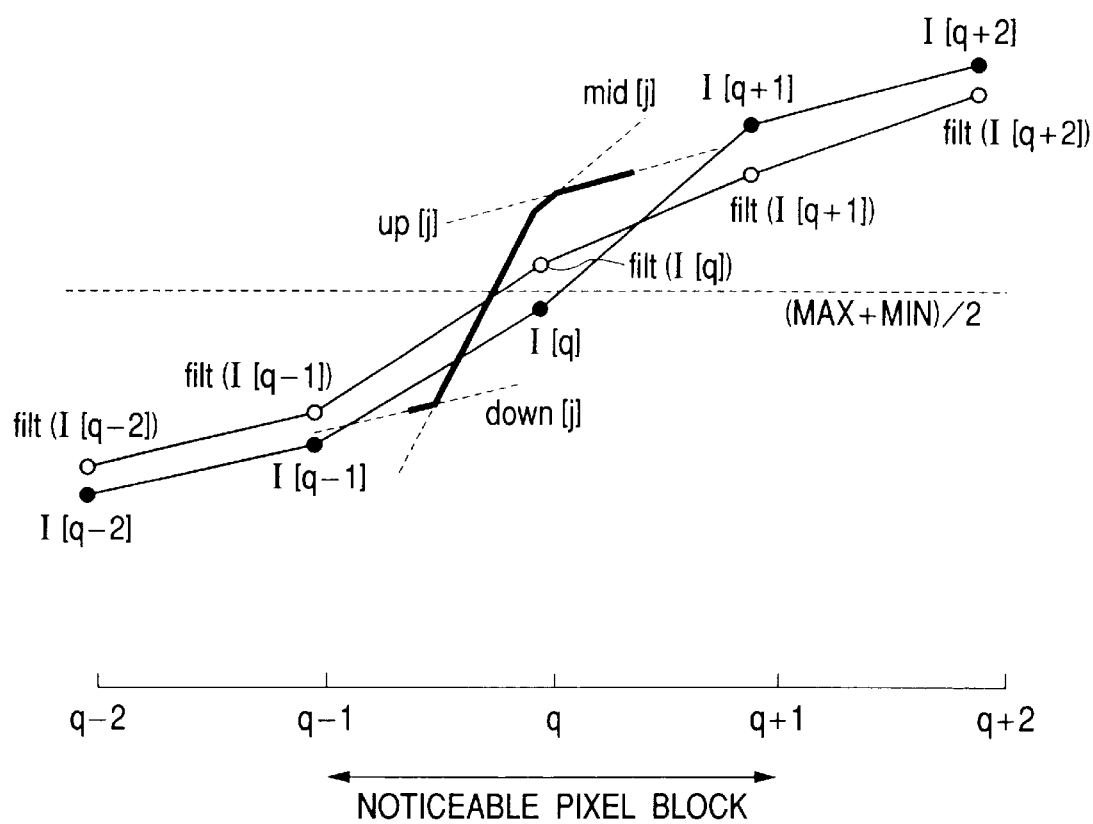
FIG. 17 is an illustration showing a case of generating high-resolution information for a noticeable-pixel block.
Figure 18:
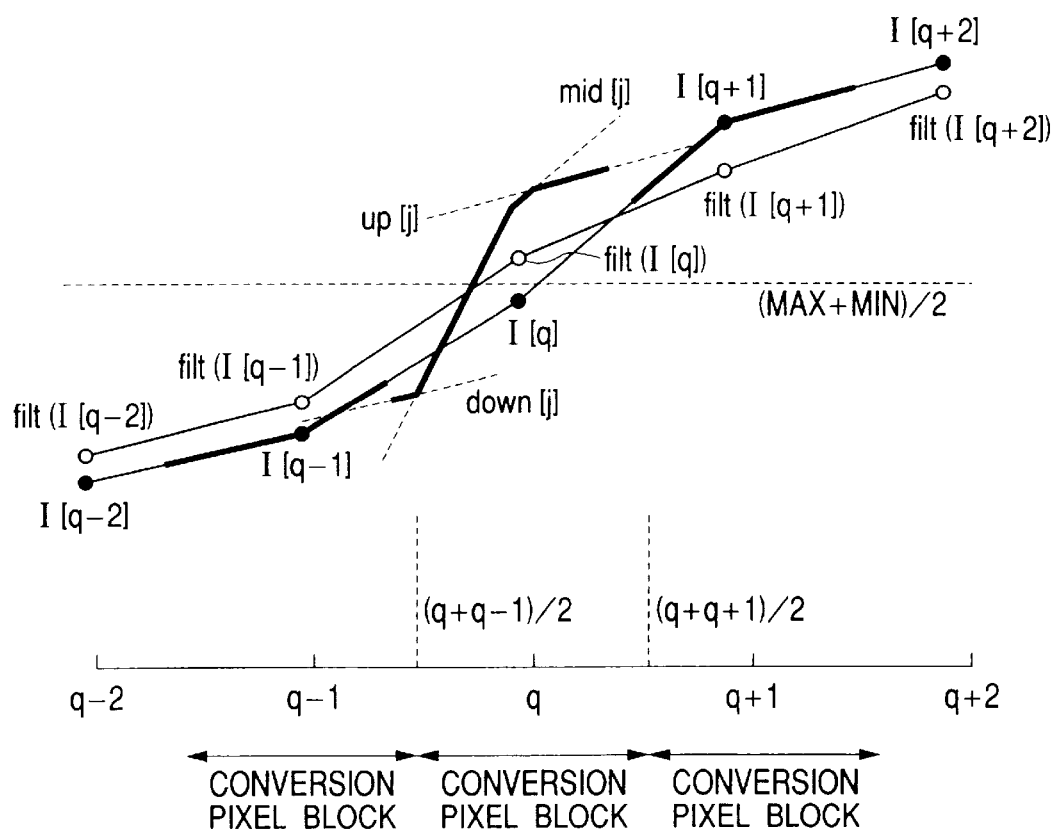
FIG. 18 is an illustration showing a case of generating high-resolution information when using a conventional example.
Figure 19:
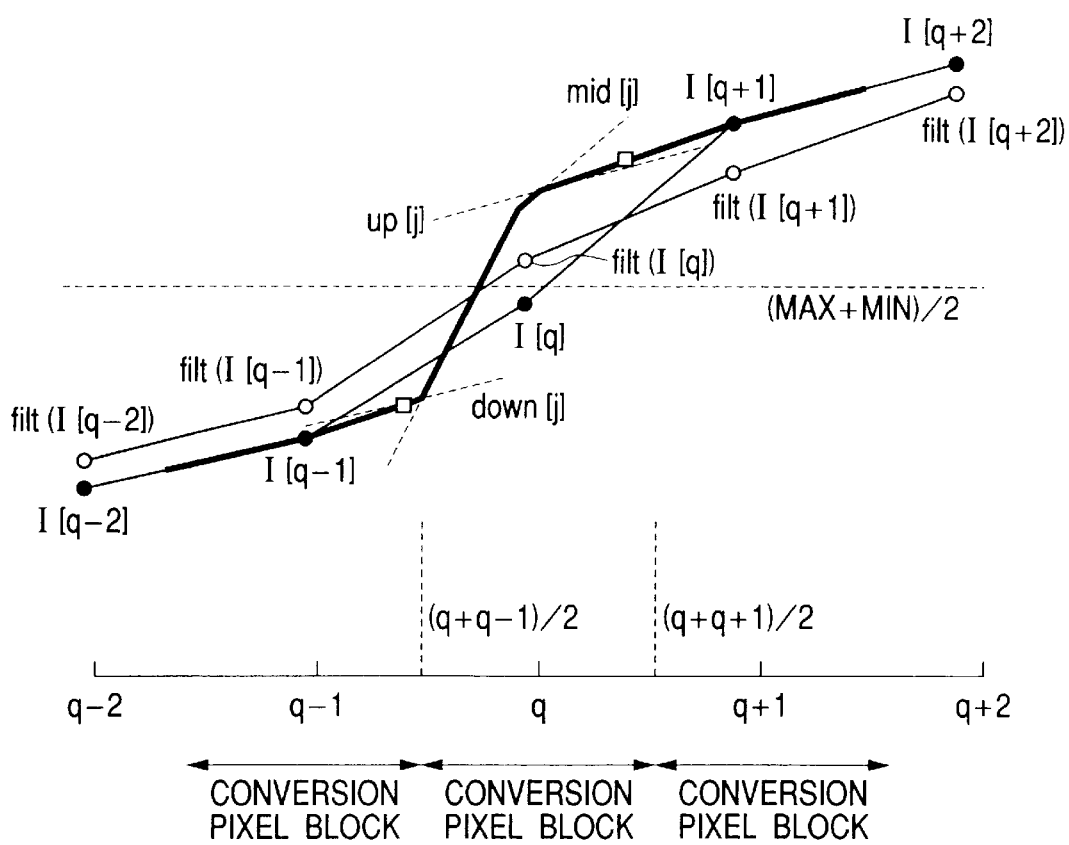
FIG. 19 is an illustration showing a case of generating high-resolution information when using the present invention.

FIGS. 17, 18 and 19 are described below. FIG. 17 shows a case of using the pixel value information of the first window formation unit, in which the abscissa shows spatial coordinate and the longitudinal direction shows density. When assuming a noticeable pixel as a point q, an observation pixel value becomes I[q] shown by a black-circle mark (pixel values of spatially front and rear sample points are assumed as I[q−2], I[q−1], I[q], I[q+1] and I[q+2]). The noticeable pixel is analogously shown using an interpolation range when converting the noticeable pixel as a noticeable-pixel block. The locus shown by a thick line serves as an output OUT[j] of the noticeable pixel depending on the relation between sizes of the above described three loci up[j], down[j] and mid[j].

FIG. 18 shows loci of conversion values according to the conventional example (Japanese Patent Application Laid-Open No. 10-248012) when points q−1 and q+1 serving as spatially front and rear pixels are linearly interpolated in addition to the loci in FIG. 17. As shown in FIG. 18, when the points q−1 and q+1 are noticeable pixels, the locus of linear interpolation of the observation pixel value shown by a black-circle mark is traced. The interpolation range of each sample point is hereafter referred to as a conversion pixel block. That is, a discontinuous distortion occurs when conversion pixel blocks are changed. In FIG. 18, boundary points of conversion pixel blocks are midpoints between sample points q and q−1 and between sample points q and q+1.

FIG. 19 shows loci of conversion values when using the structure of the present embodiment in FIG. 1. That is, when a point q−1 is a noticeable pixel, the conversion system uses linear interpolation. Moreover, because the conversion system of an adjacent pixel (corresponding to a point q in this case) uses nonlinear interpolation, a nonlinear interpolation value of the boundary point (shown by a white-square mark) of a conversion pixel serving as the midpoint between points q and q+1 is calculated to calculate linear interpolation in accordance with a conversion value of the nonlinear interpolation value. Also when a point q+1 is a noticeable pixel, a nonlinear interpolation value of the boundary point (shown by a white-square mark) of a conversion pixel block serving as the midpoint between the points q and q+1 is calculated to calculate linear interpolation in accordance with a conversion value of the nonlinear interpolation value. As shown in FIG. 19, it is possible to form a preferable high-resolution edge having continuity even at the boundary point between conversion pixel blocks.

Conversion systems of linear interpolation and nonlinear interpolation are described above by comparing orders of the systems. Moreover, order comparison with zero-order interpolation is considered as a matter of course.

By realizing the present invention, continuity is not broken even if using any nonlinear interpolation. That is, when experimentally designing an image for resolution conversion, it is possible to adjust a high-resolution edge to be formed to hard and soft states. Even when having extreme nonlinearity not using a sample value as an interpolation value, it is possible to always realize continuous conversion.

In the case of an interpolation method of using a sample value of original information as an interpolation value, which is frequently used for conventional nonlinear-interpolation arts, there is a limit in realizing nonlinear interpolation. That is, because the method only shifts a portion between sample points of original information to a nonlinear state, it is not effective for reduction of interpolation halation or jaggies.

To greatly reduce interpolation halation and jaggies and generate a minute high-resolution information, it is necessary to use an interpolation method of setting no sample value of original information as an interpolation value. This is because a sample value of original information depends on input resolution that is a low resolution. In this case, however, a lack of continuity after using nonlinear interpolation is a problem.

The thought of the present invention is nonlinear interpolation+dynamic interpolation. In this case, dynamic interpolation represents that interpolation to be calculated in accordance with a sample point and interpolation to be calculated in accordance with a conversion value of a set representative point are dynamically switched. In other words, dynamic interpolation represents that positions of a representative point used for interpolation calculation are dynamically changed. A combination between conversion systems of a noticeable pixel and an adjacent pixel controls a dynamic change. Because conversion systems are sequenced, conversion according to priority can be made even at a boundary point.

For the present embodiment, dynamic interpolation is described as nonlinear interpolation+dynamic linear interpolation by using linear interpolation as an example. As a matter of course, a case of nonlinear interpolation+dynamic nonlinear interpolation is also considered. In this case, it is preferable to sequence several priorities even in nonlinear interpolation.

Moreover, by the art of the present embodiment and resolution conversion, it is possible to provide various products such as a printer, video printer, and application software for which a high-image-quality output can be expected even in the case of an image having a small information content such as an image circulating through Internet or an image input from a digital camera.

Furthermore, as an image processing apparatus of the present invention, it is permitted to use not only an integrally or separately set unit serving as an image output terminal of an information processor such as a computer but also a copying machine combined with a reader or a facsimile system having a transmission/reception function.

Furthermore, the present invention can be applied to a system constituted of a plurality of devices such as a host computer, interface unit, reader and printer. Furthermore, the present invention can be applied to a single device such as a copying machine or facsimile device.

Furthermore, the present invention can be applied to the case in which a storage medium storing a program code of software, for realizing the function of the above embodiment is supplied to a system or apparatus and the computer (or CPU or MPU) of the system or apparatus reads and executes the program code stored in the storage medium.

In this case, the program code read out of the storage medium constitutes the function of the above embodiment and the storage medium storing the program code constitutes the present invention.

The storage medium for supplying a program code can use one of a floppy disk, hard disk, optical disk, magnetooptical disk, CR-ROM, CR-R, magnetic tape, nonvolatile memory card and ROM.

Moreover, by executing the program code read by the computer, it is needless to say that not only a case in which the function of the above embodiment is realized but also a case in which an OS (operating system) working on the computer executes a part or the whole of actual processing in accordance with an instruction of the program code and thereby the function of the above embodiment is realized are included.

Moreover, it is needless to say that a case in which after the program code read out of the storage medium is written in a memory provided for a function expanding board set in the computer or function expanding unit connected to the computer, a CPU provided for the function expanding board or function expanding unit executes a part or the whole of actual processing in accordance with an instruction of the program code and the function of the above embodiment is realized is included.

As described above, the present invention makes it possible to realize a conversion not causing halation due to interpolation when converting input low-resolution information into high-resolution information, not depending on low resolution of input original information, or not causing jaggies at all and superior in image quality and extinguish discontinuity at a boundary point every conversion in conversions provided with nonlinearity which is a problem in conventional processing. Therefore, it is possible to generate preferable high-resolution information in which continuity is not broken in any conversion provided with nonlinearity. Moreover, as a result, the flexibility of nonlinearity usable for formation of a high-resolution edge is greatly improved.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing apparatus for inputting low-resolution video information, expanding one pixel to N×M pixels (each of N and M is an integer equal to or larger than 1, excluding a case of N=1 and M=1), comprising:

first window formation means for referring to peripheral pixels including a noticeable pixel;

a plurality of conversion means different in conversion method for converting one pixel into N×M pixels; and selection means for selecting a proper conversion means from said plurality of conversion means in accordance with a distribution state of pixel values in the first window, wherein said conversion means evaluate the type of said selected conversion means in adjacent pixels including the noticeable pixel and calculate conversion values of N×M pixels in accordance with the evaluation result, and wherein said conversion means further comprises:

second window formation means for referring to the type of said selected conversion means in adjacent pixels including a noticeable pixel; and evaluation means for evaluating a combination in a second window.

2. An apparatus according to claim 1, wherein said conversion means further comprises:

setting means for setting a representative point at the boundary between the noticeable pixel and an adjacent pixel in accordance with an evaluation result by said evaluation means; and representative-point conversion means for calculating a conversion value of the representative point in accordance with a conversion condition of selected conversion means of the adjacent pixel, and wherein said conversion means calculates conversion values for N×M pixels of the noticeable pixel.

3. An apparatus according to claim 2, wherein an order showing a priority is set to each of said plurality of conversion means and said evaluation means evaluates orders by comparing the orders.

4. An apparatus according to claim 3, wherein evaluation by said evaluation means is performed by converting a noticeable pixel in accordance with the conversion value of the representative point when the priority of the order of the noticeable pixel is lower than that of the order of an adjacent pixel.

5. An apparatus according to claim 1, wherein at least one of said plurality of conversion means performs nonlinear conversion in which a spatial change value of an interpolation point and a change value of an interpolation value are kept in a nonlinear relation.

6. An apparatus according to claim 3, wherein at least one of said plurality of conversion means performs linear interpolation in which a spatial change value of an interpolation point and a change value of an interpolation value are kept in a linear relation and sets an order of priority lower than that of the case of the nonlinear interpolation.

7. An apparatus according to claim 4, wherein at least one of said plurality of conversion means performs linear interpolation in which a spatial change value of an interpolation point and a change value of an interpolation value are kept in a linear relation and sets an order of priority lower than that of the case of the nonlinear interpolation.

8. An apparatus according to claim 2, wherein conversion values for N×M pixels of a noticeable pixel are calculated by performing linear interpolation in accordance with the conversion value of the representative point.

9. An apparatus according to claim 5, wherein at least one of said plurality of conversion means performs linear interpolation in which a spatial change value of an interpolation point and a change value of an interpolation value are kept in a linear interpolation and dynamically switches whether to perform linear interpolation in accordance with a sample point or in accordance with the change value of the representative point.

10. An image processing method for inputting low resolution information, expanding one pixel to N×M pixels (each of N and M is an integer equal to or larger than 1, excluding a case of N=1 and M=1), and resolution-converting the input image into a high resolution image, comprising:

a first window formation step for referring to peripheral pixels including a noticeable pixel;

a plurality of conversion steps different from each other in conversion method for converting one pixel into N×M pixels; and selection step for selecting a proper conversion step out of said plurality of conversion steps, wherein said conversion steps evaluate said selected conversion step in adjacent pixels including a noticeable pixel and calculate conversion values for N×M pixels of the noticeable pixel in accordance with the evaluation result, and wherein said conversion steps further comprise:
a second window formation step of referring to the type of said selected conversion step in adjacent pixels including a noticeable pixel; and
an evaluation step of evaluating a combination in a second window.

11. A method according to claim 10, wherein said conversion step further comprises:

a setting step for setting a representative point at the boundary between the noticeable pixel and each adjacent pixel in accordance with an evaluation result by said evaluation step; and a representative-point conversion step for calculating a conversion value of the representative point in accordance with a conversion condition of a conversion step in which adjacent pixels are selected, and wherein said conversion step calculates conversion values for N×M pixels of the noticeable pixel in accordance with the conversion value of the representative point.

12. A computer-readable storage medium storing a program code of an image processing method for inputting low-resolution video information, expanding one pixel to N×M pixels (each of N and M is an integer equal to or larger than 1, excluding a case of N=1 and M=1), and resolution-converting the input image to a high-resolution image, having:

a code of a first window formation step for referring to peripheral pixels including a noticeable pixel;

codes of a plurality of conversion steps different from each other in conversion method for converting one pixel into N×M pixels; and code of a selection step for selecting a proper conversion step output the above plurality of conversion steps in accordance with a distribution state of pixel values in a first window, wherein the codes of the conversion steps evaluate the type of a selected conversion step in adjacent pixels including a noticeable pixel and calculate conversion values for N×M pixels of the noticeable pixel in accordance with the evaluation result, and wherein said codes of the plurality of conversion steps further have:
a code of a second window formation step of referring to the type of said selected conversion step in adjacent pixels including a noticeable pixel; and
a code of an evaluation step of evaluating a combination in a second window.

13. An image processing apparatus for inputting low-resolution video information, expanding one pixel to N×M pixels (each of N and M is an integer equal to or larger than 1, excluding a case of N=1 and M=1), comprising:

first window formation means for referring to peripheral pixels including a noticeable pixel;

a plurality of conversion means different in conversion method for converting one pixel into N×M pixels; and selection means for selecting a proper conversion means from said plurality of conversion means in accordance with a distribution state of pixel values in the first window, wherein said conversion means evaluate the type of said selected conversion means in adjacent pixels including the noticeable pixel and calculate conversion values of N×M pixels in accordance with the evaluation result, and wherein at least one of said plurality of conversion means performs nonlinear conversion in which a spatial change value of an interpolation point and a change value of an interpolation value are kept in a nonlinear relation.

14. An image processing method for inputting low-resolution video information, expanding one pixel to N×M pixels (each of N and M is an integer equal to or larger than 1, excluding a case of N=1 and M=1), comprising:

a first window formation step of referring to peripheral pixels including a noticeable pixel;

a plurality of conversion steps different in conversion method for converting one pixel into N×M pixels; and a selection step of selecting a proper conversion step from said plurality of conversion steps in accordance with a distribution state of pixel values in the first window, wherein said conversion steps evaluate the type of said selected conversion step in adjacent pixels including the noticeable pixel and calculate conversion values of N×M pixels in accordance with the evaluation result, and wherein at least one of said plurality of conversion steps performs nonlinear conversion in which a spatial change value of an interpolation point and a change value of an interpolation value are kept in a nonlinear relation.

* * * * *

UNITED STATES PATENT AND TRADEMARK OFFICE
CERTIFICATE OF CORRECTION

PATENT NO. : 6,714,693 B1
DATED : March 30, 2004
INVENTOR(S) : Miyake

It is certified that error appears in the above-identified patent and that said Letters Patent is hereby corrected as shown below:

Title page,
Item [57], ABSTRACT,
Line 11, "calculates" should read -- calculate --.

Column 9,
Line 31, "orders" should read -- orders to --; and
Line 34, "is" should read -- are --.

Column 12,
Line 11, "simply" should read -- simplify --;
Line 37, "describes" should read -- describe --; and
Lines 38 and 45, "simply" should read -- simplify --.

Column 13,
Line 27, "interpolation described for FIGS. 13 and 16," should read -- change actual absolute output resolutions {e.g. values which can be displayed by dpi (dot per inch) or ppi (pixel per inch)} by evaluating them. --;
Lines 28-30 should be deleted.
Line 34, "previosly" should read -- previously --;
Line 37, "structured" should read -- structure --;
Line 40, "adaptyve" should read -- adaptive -- and "pixal values when per" should read -- pixel --;
Line 41, "forming adaptive interpolation" should be deleted;
Line 43, "conntinuity" should read -- continuity --; and
Line 44, "charged" should read -- changed --.

Column 16,
Line 5, "expect" should read -- except --.

UNITED STATES PATENT AND TRADEMARK OFFICE
CERTIFICATE OF CORRECTION

PATENT NO. : 6,714,693 B1
DATED : March 30, 2004
INVENTOR(S) : Miyake

It is certified that error appears in the above-identified patent and that said Letters Patent is hereby corrected as shown below:

Column 18,
Line 1, "code" should read -- a code --.

Signed and Sealed this

Twenty-fourth Day of August, 2004

JON W. DUDAS
*Director of the United States Patent and Trademark Office*